Sept. 13, 1966 P. N. ARMSTRONG 3,273,127

DIGITAL SORTING SYSTEM

Filed Sept. 4, 1962 3 Sheets-Sheet 1

INVENTOR.
Philip N. Armstrong
By Keith D. Beecher
Attorney

Fig. 2a

Inputs $a_1 - a_n$, $a_u$; Outputs $k_1 - k_{n+1}$ $\bar{I}_1 a_u \bar{a}_1 \longrightarrow$ Set $E_1$ ------ $E_n$ $\bar{I}_q a_u \bar{a}_q \longrightarrow$ Set $E_q$ ------ $E_n$ $\bar{E}_q \bar{a}_u a_q \longrightarrow$ Set $I_1$ ------ $I_q$ $\bar{E}_n \bar{a}_u a_n \longrightarrow$ Set $I_1$ ------ $I_n$ $$k_1 = a_1 \bar{E}_1 + a_u \bar{I}_1$$

$$k_2 = a_2 \bar{E}_2 + a_1 E_1 + a_u(\bar{I}_2 a_1 + \bar{E}_1 E_2)$$

$$k_q = a_q \bar{E}_q + a_{q-1} E_{q-1} + a_u(\bar{I}_q a_{q-1} + \bar{E}_{q-1} E_q)$$

$$k_n = a_n \bar{E}_n + a_{n-1} E_{n-1} + a_u(\bar{I}_n a_{n-1} + \bar{E}_{n-1} E_n)$$

$$k_{n+1} = a_n E_n + a_u I_n + a_u a_n$$

Fig. 2b $\bar{I}_1 a_u \bar{a}_1 \longrightarrow$ Set $E_1$ --- $E_4$ $\bar{I}_2 a_u \bar{a}_2 \longrightarrow$ Set $E_2$ --- $E_4$ $\bar{I}_3 a_u \bar{a}_3 \longrightarrow$ Set $E_3$ --- $E_4$ $\bar{I}_4 a_u \bar{a}_4 \longrightarrow$ Set $E_4$ $\bar{E}_1 \bar{a}_u a_1 \longrightarrow$ Set $I_1$ $\bar{E}_2 \bar{a}_u a_2 \longrightarrow$ Set $I_1$ --- $I_2$ $\bar{E}_3 \bar{a}_u a_3 \longrightarrow$ Set $I_1$ --- $I_3$ $\bar{E}_4 \bar{a}_u a_4 \longrightarrow$ Set $I_1$ --- $I_4$ $$k_1 = a_1 \bar{E}_1 + a_u \bar{I}_1$$

$$k_2 = a_2 \bar{E}_2 + a_1 E_1 + a_u (\bar{I}_2 + a_1 \bar{E}_1 E_2)$$

$$k_3 = a_3 \bar{E}_3 + a_2 E_2 + a_u (\bar{I}_3 + a_2 \bar{E}_2 E_3)$$

$$k_4 = a_4 \bar{E}_4 + a_3 E_3 + a_u (\bar{I}_4 + a_3 \bar{E}_3 E_4)$$

$$k_5 = a_4 E_4 + a_u I_4 + a_u a_4$$

INVENTOR:
Philip N. Armstrong
By Keith D. Beecher
Attorney

Fig. 3 (Inputs)

| | (MSD) $P_0$ | $P_1$ | $P_2$ | $P_3$ | $P_4$ | $P_5$ | $P_6$ |
|---|---|---|---|---|---|---|---|
| $a_1$ | 1 | 1 | 0 | 0 | 1 | 1 | 1 |
| $a_2$ | 1 | 1 | 0 | 0 | 0 | 1 | 0 |
| $a_3$ | 1 | 0 | 1 | 1 | 1 | 1 | 0 |
| $a_4$ | 0 | 1 | 0 | 1 | 1 | 1 | 1 |
| $a_u$ | 1 | 1 | 0 | 0 | 0 | 0 | 0 |

Decreasing

Fig. 4 (Sorted Outputs)

| | $P_6$ | $P_5$ | $P_4$ | $P_3$ | $P_2$ | $P_1$ | $P_0$ |
|---|---|---|---|---|---|---|---|
| $R_1$ | 1 | 1 | 1 | 0 | 0 | 1 | 1 ($a_1$) |
| $R_2$ | 0 | 1 | 0 | 0 | 0 | 1 | 1 ($a_2$) |
| $R_3$ | 0 | 0 | 0 | 0 | 0 | 1 | 1 ($a_u$) |
| $R_4$ | 0 | 1 | 1 | 1 | 1 | 0 | 1 ($a_3$) |
| $R_5$ | 1 | 1 | 1 | 1 | 0 | 1 | 0 ($a_4$) |

Decreasing

INVENTOR:
Philip N. Armstrong

By Keith D. Beecher

Attorney

United States Patent Office 3,273,127

Patented Sept. 13, 1966

3,273,127

DIGITAL SORTING SYSTEM

Philip N. Armstrong, 17331 Keegan Way, Santa Ana, Calif.

Filed Sept. 4, 1962, Ser. No. 221,143
3 Claims. (Cl. 340—172.5)

The present invention relates to an improved digital sorting system and network for use in data handling systems.

Copending application Ser. No. 208,007 filed July 6, 1962, which has now been abandoned and replaced by continuation application Ser. No. 347,650, filed Feb. 24, 1964, discloses and claims a data handling system which is capable of rearranging and sorting a plurality of records which are identified by individual multi-bit binary signals recorded in corresponding control fields.

The system of the copening application responds to the multi-digit binary signals in the respective control fields to perform a sorting operation and to rearrange the records into a particular sequence. The system of the copending application is advantageous in that it is capable of performing such a sorting operation in a rapid and efficient manner, and with a minimum of storage requirements.

In the operation of the sorting system of the copending application, the records are introduced serially into the sorting system. The sorting system is so conceived that the records previously fed into the system are arranged in an ascending or descending sequence in accordance with the binary signals in their respective control fields; and as each new record is fed into the system; its identifying binary signal is compared with the identifying binary signals of the sequenced records already in the system, and it is sorted into its proper place in the sequence of records.

The data handling system of the copending application requires a sorting network which is capable of comparing the identifying multi-bit binary signal of the record about to be fed into the system with the identifying binary numbers of the sequenced records already in the system. The sorting network is also required to rearrange the new record with respect to the previously sequenced records, so that the new record may be sorted into its proper place in the sequence.

The present invention provides an improved sorting network which is particularly useful in data handling systems of the general type disclosed in the copending application. However, it will become evident as the description proceeds, that the sorting network of the present invention has general utility whenever it is desired to compare a particular binary signal with a plurality of sequenced binary signals, and to insert the compared signal into its proper position in the sequence.

The sorting network of the invention is advantageous in that it is susceptible to a modular construction, with modules being added or subtracted depending upon the number of binary signals to be compared and sorted. The network of the invention is further advantageous in that the addition of modules into the system does not delay in any manner the speed at which the sorting is accomplished. The system operates in such a manner that the sorting proceeds on a bit-by-bit basis and at a particular rate, regardless of the number of signals to be compared and sorted.

Another advantages of the invention is that its component parts may be reduced to a minimum. For example, as will be described, a plurality of flip-flops are utilized in the system of the invention to provide exchange and inhibit control functions for the binary signals passed through the sorting network. It will be apparent as the description proceeds, that the number of such flip-flops may be reduced by including them in a usual binary counter arrangement so that a plurality of different counter states may be derived by the cooperation of two or more flip-flops, with the possible number of different states exceeding the actual number of flip-flops used.

Another advantage of the invention is the provision of circuitry which permits the information to be passed through the different gating circuits and switched thereby from one output terminal to another without any timing delays as the switching action is being carried out.

It is, accordingly, an object of the present invention to provide an improved sorting network in which the number of required components is materially reduced and the associated circuitry is materially simplified, as compared with the prior art sorting networks of the same general type.

A more general object of the invention is to provide an improved sorting network which is relatively simple and inexpensive to construct, and which is capable of inserting a new record into its proper place in a previously sorted sequence of records in a rapid and straightforward manner and without any time delays while switching operations are being carried out.

Yet another object is to provide such an improved network which is flexible in its construction, and which may be easily adapted to handle any desired number of inputs.

Other objects and advantages of the invention will become apparent from a consideration of the following specification, when taken in conjunction with the accompanying drawings, in which:

FIGURES 2A and 2B are logical equations respectively designating the circuitry and operation of the network of the invention in a general case, and in the particular case of FIGURE 1;

FIGURE 3 is a table useful in explaining the operation of the network of FIGURE 1, and illustrating a particular set of multi-bit binary signal inputs fed into the system of FIGURE 1; and FIGURE 4 is a table illustrating the resulting sorted outputs from the inputs of FIGURE 3, as derived from the output terminals of the network of FIGURE 1.

Figure 1:
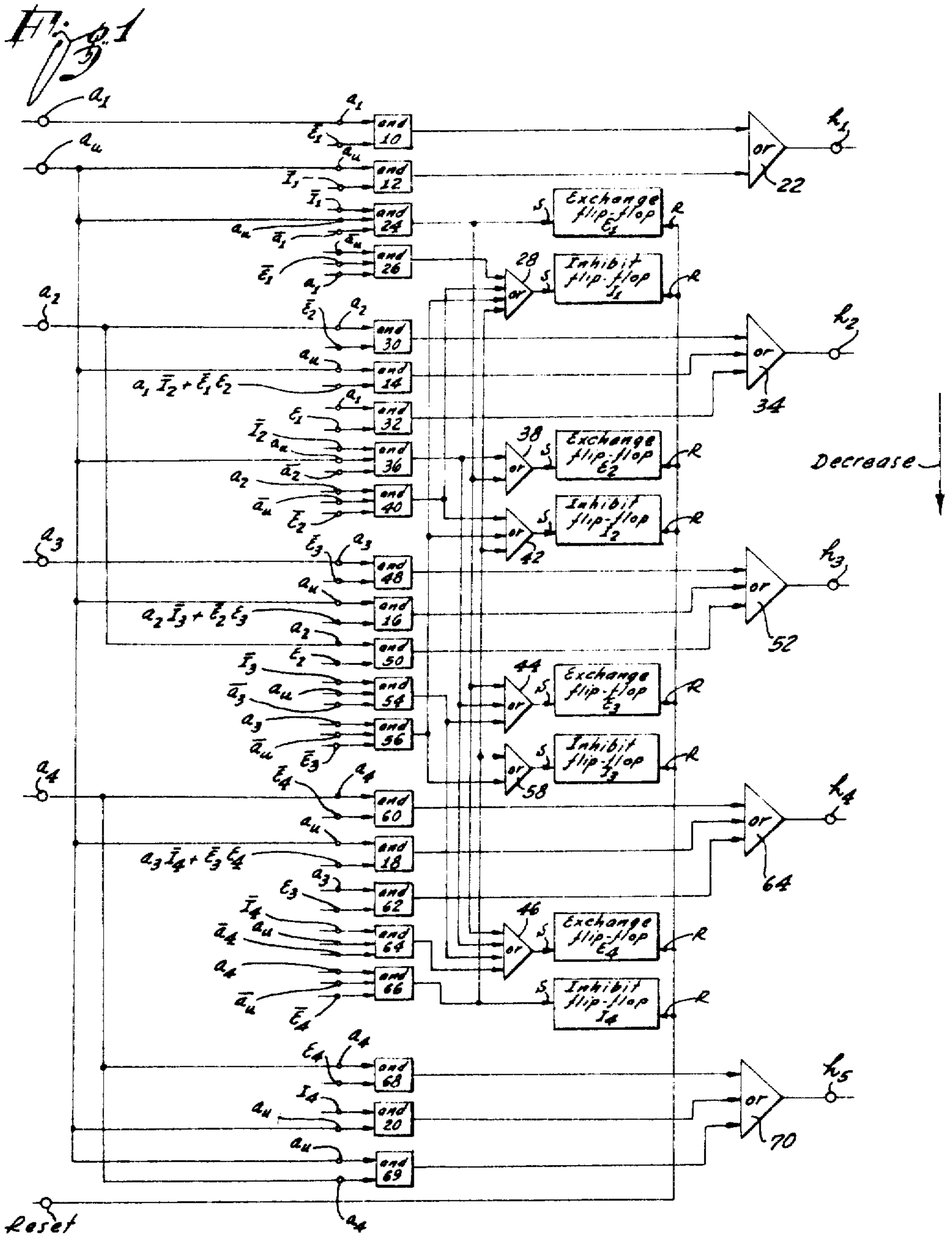
FIGURE 1 is a block diagram of a sorting network constructed in accordance with the concepts of the invention.

It will be appreciated that the network of FIGURE 1 is made up of a plurality of bi-stabe circuits, commonly known as flip-flops; and of a plurality of "and" gates and "or" gates. These flip-flop and gate circuits are extremely well known to the electronic art, and it is believed that a detailed description of the functioning of such circuits, or of appropriate circuitry for such circuits, is unnecessary herein.

It may be mentioned, however, that a flip-flop is capable of being set from a stable "reset" condition to a stable "set" condition in response to an appropriate signal applied to its "set" input terminal. The flip-flop then will remain in its "set" condition until a reset signal is applied to its "reset" input terminal.

Likewise, it should be pointed out that an "and" gate is enabled when all of its input terms have a particular binary value, whereas, an "or" gate is enabled when any one of its input terms has a predetermined binary value.

The network of FIGURE 1 is intended to compare a multi-bit binary signal serially introduced on a bit-by-bit basis to its input terminal $a_u$, with a plurality of multi-bit binary signals of the same length, and which are introduced respectively to the input terminals $a_1$–$a_4$. The binary signals in the plurality applied to the input terminals $a_1$–$a_4$ are assumed to have been previously sequenced in a descending progression, and it is the function of the network of FIGURE 1 to compare the binary signal applied to the input terminal $a_u$ with each of the binary signals applied to the terminals $a_1$–$a_4$, and to shift the first-named binary signal into its proper place in the sequence. The result is a sequence of five binary signals at the output terminals $h_1$–$h_5$, with the first-named binary signal being shifted to its proper position in the sequence.

It will be appreciated that all the binary signals to be compared have equal length, and that all are simultaneously applied to the input terminals, with each being applied on a serial bit-by-bit basis to each input terminal. It will also be appreciated that the binary signals compared in the network of FIGURE 1 may be contained in corresponding control fields to identify corresponding records, so that a sorting of the binary signals in the network of FIGURE 1 also provides a sorting of the associated records.

It should also be pointed out that, for purposes of simplicity, the usual clock signals required to trigger the flip-flops in the network of FIGURE 1 at the appropriate times have been omitted.

The network of FIGURE 1 includes a plurality of exchange flip-flops $E_1$–$E_4$, and it includes a plurality of inhibit flip-flops $I_1$–$I_4$. These flip-flops provide respective gating terms to the various "and" gates included in the network, as will be described. Although separate exchange and inhibit flip-flops are illustrated as provided for each input terminal, it will be appreciated that these flip-flops may be grouped into appropriate binary counter circuits, so that their number may be reduced. It will also be appreciated that although the network of FIGURE 1 is limited to an operation of a binary signal $a_u$ on a sequence of four input signals $a_1$–$a_4$, more or less input signals may be handled, merely by increasing or decreasing the number of input and output terminals and the associated control and gating circuitry.

The input terminal $a_1$ of the circuit of FIGURE 1 is connected to an "and" gate 10, and the input terminal $a_u$ is connected to each of a plurality of "and" gates 12, 14, 16, 18, 20 and 21. The term $\overline{E_1}$ is applied to the "and" gate 10, and the term $\overline{I_1}$ is applied to the "and" gate 12. The "and" gates 10 and 12 are connected to an "or" gate 22 which, in turn, is connected to the output terminal $h_1$.

An "and" gate 24 is connected to the set input terminal of the exchange flip-flop $E_1$, and an "and" gate 26 is connected through an "or" gate 28 to the set input terminal of the inhibit flip-flop $I_1$. An appropriate reset signal is applied to the reset terminals of all the flip-flops in the circuit at the outset, so that all the flip-flops are initially in their reset state.

The terms $\overline{I_1}$, $a_u$ and $\overline{a_1}$ are applied to the "and" gate 24. The terms $\overline{a_u}$, $\overline{E_1}$ and $a_1$ are applied to the "and" gate 26.

The input terminal $a_2$ is connected to an "and" gate 30, and this "and" gate together with the "and" gate 14 and an "and" gate 32 are connected through an "or" gate 34 to the output terminal $h_2$. The term $\overline{E_2}$ is introduced to the "and" gate 30. The terms $a_1\overline{I_2}+\overline{E_1}E_2$ are introduced to the "and" gate 14. The terms $a_1$ and $E_1$ are introduced to the "and" gate 32.

An "and" gate 36 is connected to an "or" gate 38 which, in turn, is connected to the set input terminal of the exchange flip-flop $E_2$. An "and" gate 40 is connected to an "or" gate 42 which, in turn, is connected to the set input terminal of the inhibit flip-flop $I_2$. The terms $\overline{I_2}$, $a_u$ and $\overline{a_2}$ are applied to the "and" gate 36. The terms $a_2$, $\overline{a_u}$ and $\overline{E_2}$ are applied to the "and" gate 40.

The "and" gate 40 is also connected to the "or" gate 28. The "and" gate 24 is also connected to the "or" gate 38, and this latter "and" gate is also connected to further "or" gates 44 and 46. The "or" gate 44 is connected to the set input terminal of the exchange flip-flop $E_3$, and the "or" gate 46 is connected to the set input terminal of the exchange flip-flop $E_4$. The "and" gate 36 is also connected to the "or" gates 44 and 46.

The input terminal $a_3$ is connected to an "and" gate 48. The "and" gate 48, together with the "and" gate 16 and an "and" gate 50 are connected through an "or" gate 52 to the output terminal $h_3$. The term $\overline{E_3}$ is introduced to the "and" gate 48. The terms $\overline{E_2}E_3+a_2\overline{I_3}$ are introduced to the "and" gate 16. The terms $a_2$ and $E_2$ are introduced to the "and" gate 50.

An "and" gate 54 is connected to the "or" gate 44, and an "and" gate 56 is connected to an "or" gate 58 which, in turn, is connected to the set input terminal of the inhibit flip-flop $I_3$. The "and" gate 56 is also connected to the "or" gates 28 and 42. The "and" gate 54 is also connected to the "or" gate 46.

The terms $\overline{I_3}$, $a_u$, $\overline{a_3}$ are introduced to the "and" gate 54. The terms $a_3$, $\overline{a_u}$ and $\overline{E_3}$ are introduced to the "and" gate 56.

The input terminal $a_4$ is connected to an "and" gate 60. The "and" gate 60, together with the "and" gate 18 and an "and" gate 62 are connected to an "or" gate 64. The "or" gate 64 is connected to an output terminal $h_4$. The term $\overline{E_4}$ is applied to the "and" gate 60. The terms $a_3\overline{I_4}+\overline{E_3}E_4$ are applied to the "and" gate 18. The terms $a_3$, $E_3$ are applied to the "and" gate 62.

The terms $\overline{I_4}$, $a_u$ and $\overline{a_4}$ are applied to an "and" gate 64. The "and" gate 64 is connected to the "or" gate 46. The terms $a_4$, $\overline{a_u}$ and $\overline{E_4}$, are applied to an "and" gate 66. The "and" gate 66 is connected to the set input terminal of the inhibit flip-flop $I_4$. The "and" gate 66 is also connected to the "or" gates 28, 42 and 58.

The input terminal $a_4$ is also connected to an "and" gate 68 and to an "and" gate 69. The term $E_4$ is applied to the "and" gate 68. The term $a_4$ is also applied to the "and" gate 69. The term $I_4$ is applied to the "and" gate 20. The "and" gates 68, 69 and 20 are connected to an "or" gate 70 which, in turn, is connected to the output terminal $h_5$.

The terms introduced to the "and" gates of the network of FIGURE 1 are in accordance with the logic expressions and equations of FIGURES 2A and 2B. The expressions and equations of FIGURE 2A represent the general system in which there are $n$ multi-bit binary signals in the sequence applied to corresponding input terminals $a_1$–$a_n$. In the general system, there are $n+1$ output terminals designated $h_1$–$h_{n+1}$. The terms with the subscript Q are intended to represent any particular input-output line in the general system.

The logic expressions and equations of FIGURE 2B represent the particular network of FIGURE 1. In the particular network, there are assumed to be four multi-bit binary signals $a_1$–$a_4$ in the sequence, and these are compared with a fifth signal $a_u$.

For purposes of explanation, the four sequenced multi-bit binary signals applied to the input terminals $a_1$–$a_4$ may be assumed to have the values shown in FIGURE 3, each of these signals being an eight-bit binary signal. The unknown multi-bit binary signal introduced to the input terminal $a_u$ may also have the illustrated value.

It will be appreciated, that the proper position for the signal $a_u$ is between the signals $a_2$ and $a_3$. The network of the invention functions to compare the signal $a_u$ with each of the sequenced signals $a_1$–$a_4$; so that the signal $a_u$ may be sorted into the sequence, and so that all the signals may appear at the output terminals $h_1$–$h_5$ in a sorted sequence, such as shown in FIGURE 4.

For purposes of explanation, it is assumed that the value of the binary signal is decreasing from the input terminal $a_1$ to the input terminal $a_4$. This decreasing sequence is illustrated by the values of the signals $a_1$–$a_4$ in FIGURE 3.

The first bit of the signal $a_u$ is compared at P0 bit time of each of the signals $a_1$–$a_4$ of FIGURE 3 in the network of FIGURE 1. For this comparison, all the flip-flops $E_1$–$E_4$, $I_1$–$I_4$ are reset, and unless an inequality is found between the P0 bit of the signal $a_u$ and the P0 bit of any of the sequenced signals $a_1$–$a_4$, all the signals will pass through the network of FIGURE 1. For such a condition, all the P0 bits will appear in the same order at the output terminals $h_1$–$h_5$. However, in the particular example shown in FIGURE 3, the P0 bit which for purposes of proper sorting is the most significant bit, of the $a_u$ signal is a "1," whereas the P0 bit of the $a_4$ signal is a "0." The effect of this is to set the $E_4$ exchange flip-flop, so that the P0 bit "0" of the $a_4$ signal appears at the output terminal $h_5$, rather than at the output terminal $h_4$; and the P0 bit "1" of the $a_u$ signal appears at the output terminal $h_4$.

However, in order that the information may continue to flow without delay between the input and output terminals, the "1" bit of $a_u$ at P0 bit time appears at the output terminal $h_4$ instantaneously by virtue of the $\overline{I_4}a_3$ term which already has enabled the "and" gate 18 so that it passes $a_u=1$ to the output terminal $h_4$ at P0 bit time, as is desired.

Also, the "0" bit of the $a_4$ signal is synthesized at P0 bit time on the $h_5$ line because, even though the flip-flop $E_4$ has not had a chance to be set so as to enable the gate 68, the fact that the gate is disabled at P0 bit time causes a "0" to be exhibited at the $h_5$ output terminal, which is desired. It will be appreciated, that the flip-flop $E_4$ will be set for all successive bits of the $a_4$ signal, so that the $a_4$ signal will flow through the gate 68 and appear at the output terminal $h_5$ (FIGURE 4) which is desired.

The next comparison is made at P1 bit time (FIGURE 3). Now we find that $a_u=1$ and $a_3=0$. This means that the flip-flop $E_3$ is set; and that a "1" is to appear at the $h_3$ output terminal immediately at P1 bit time and a "0" is to appear at the $h_4$ output terminal immediately at P1 bit time (FIGURE 4). The "1" at the output terminal $h_3$ appears, as desired, because the term $a_u\overline{I_3}a_2$ passes immediately through the "and" gate 16 at P1 bit time. The "0" at the output terminal $h_4$ appears because the "and" gate 60 was previously disabled, and the "and" gate 62 has not yet been enabled because the flip-flop $E_3$ has not had a chance to reach its "set" condition. However, the flip-flop $E_3$ is set for the subsequent bits of the $a_3$ signal, so that the $a_3$ signal appears at the output terminal $h_4$ (FIGURE 4) which is desired.

The next comparison is at P2 bit time. However, now that both the flip-flops $E_3$ and $E_4$ have been set, no further comparisons are effective with respect to the $a_3$ and $a_4$ signals, and these appear respectively at the $h_4$ and $h_5$ output terminals. For P2 bit time all the signals $a_1$, $a_2$ and $a_u$ have "0" bits (FIGURE 3) so that "0" bits appear at the respective output terminals $h_1$, $h_2$ and $h_3$ (FIGURE 4). Likewise, at P3 bit time, all the signals $a_1$, $a_2$ and $a_u$ have "0" bits (FIGURE 3), so that "0" bits appear at the output terminals $h_1$, $h_2$ and $h_3$ (FIGURE 4).

At P4 bit time, the $a_u$ and $a_2$ bits are "0" and the $a_1$ bit is a "1." This causes the $I_1$ flip-flop to be set so that the "and" gate 12 is disabled and only the $a_1$ signal can appear at the output terminal $h_1$. Again, the "and" gate 12 is being disabled when the $a_u$ bit is a "0," so that no timing problems arise.

Now the only comparison is between $a_2$ and $a_u$. At P5 bit time the $a_2$ bit is a "1" and the $a_u$ bit is a "0." This situation causes the $I_2$ flip-flop to be set which, in turn, disables the "and" gate 14, so that only the $a_2$ signal can appear at the output terminal $h_2$, and the $a_u$ signal appears at the output terminal $h_3$. The sort is, therefore, completed.

It will be appreciated that more or less signals may be sorted in the manner described, merely by the addition or subtraction of more input and output terminals and inter-connecting circuitry.

The invention provides, therefore, a relatively simple compare-sort network which is capable, without time delays, of comparing an unknown signal with a plurality of sequenced signals, and of inserting the unknown signal in its proper place in the sequence.

While a particular embodiment of the invention has been shown and described, modifications may be made, and it is intended in the claims to cover such modifications as fall within the spirit and scope of the invention.

What is claimed is:

1. A digital compare-sorting network for comparing an unknown multi-bit binary input signal with a plurality of sequenced multi-bit binary input signals, and for shifting the unknown binary input signal into a sorted position in the sequence, said network including: a plurality of input terminals for receiving the sequenced input signals in parallel and on a bit-by-bit serial basis; a further input terminal for receiving the unknown input signal on a bit-by-bit serial basis; a plurality of output terminals across which all said input signals appear in a sorted sequence; a plurality of gate circuits coupling said further input terminal and predetermined selections of said plurality of input terminals to respective ones of said output terminals; a plurality of exchange flip-flops and a plurality of inhibit flip-flops each having output terminals connected selectively to said gate circuits to control the passage of signals therethrough between said input and output terminals; a first plurality of compare circuits all coupled to said further input terminal and respectively coupled to said input terminals of said plurality for setting a selected one of said exchange flip-flops whenever an inequality occurs between a unity bit of said unknown input signal and a corresponding bit of any of said sequenced input signals; a second plurality of compare circuits all coupled to said further input terminal and respectively coupled to said input terminals of said plurality for setting a selected one of said inhibit flip-flops whenever an inequality occurs between a zero bit of said unknown input signal and a corresponding bit of any of said sequenced input signals, said gate circuits being thereby controlled by said exchange flip-flops effectively to shift said unknown input signal from one output terminal to the next whenever one of said exchange flip-flops is set, and to inhibit any further shift thereof when one of said inhibit flip-flops is set.

2. The digital compare-sorting network defined in claim 1 in which said bit-by-bit comparison of said unknown binary input signal with each of said sequenced input binary signals proceeds from the greatest to the least significant bits thereof.

3. The digital compare-sorting network defined in claim 1 in which said unknown binary input signal and all of said sequenced binary input signals are of equal length.

References Cited by the Examiner

UNITED STATES PATENTS 3,015,089 12/1961 Armstrong -------- 340—172.5

OTHER REFERENCES

Seeber, R. R., Jr.: Associative Self-Sorting Memory, in Proceedings of the Eastern Joint Computer Conference, vol. 18, Dec. 13–15, 1960 (pp. 179–187 relied on).

ROBERT C. BAILEY, *Primary Examiner.*

R. ZACHE, *Assistant Examiner.*